Aug. 16, 1932.  E. G. McDONALD  1,872,315
CONNECTION
Filed May 23, 1931
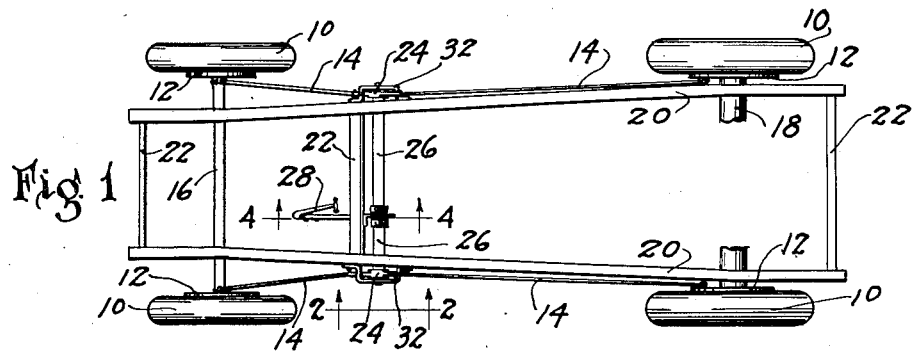
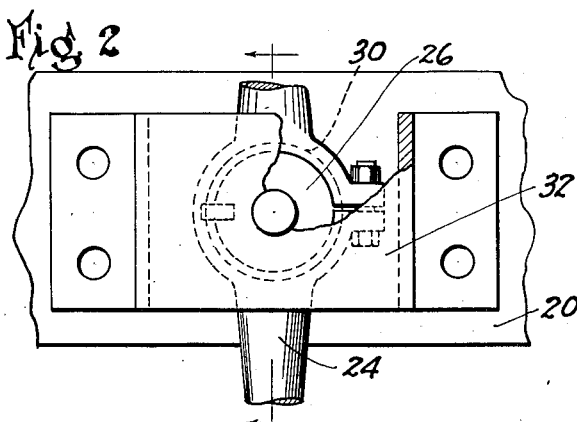
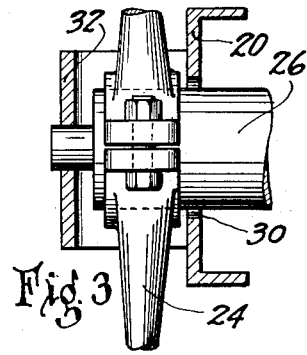
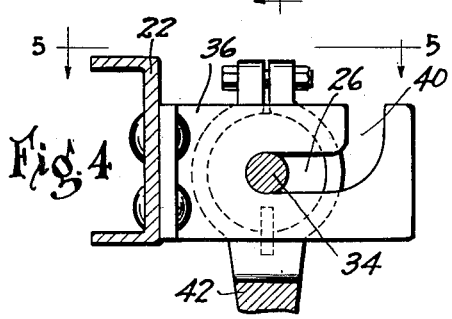
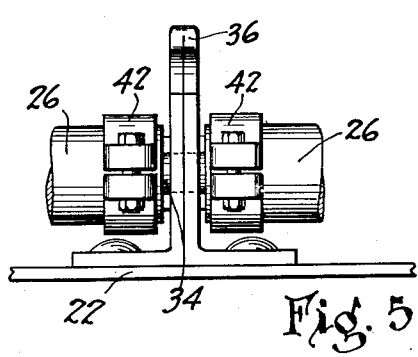
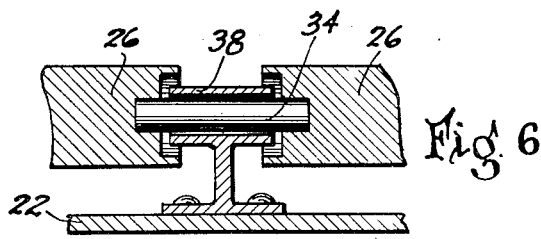
INVENTOR.
Eugene G. McDonald
BY
ATTORNEY.

Patented Aug. 16, 1932

1,872,315

UNITED STATES PATENT OFFICE

EUGENE G. McDONALD, OF SOUTH BEND, INDIANA, ASSIGNOR TO BENDIX BRAKE COMPANY, OF SOUTH BEND, INDIANA, A CORPORATION OF ILLINOIS

CONNECTION

Application filed May 23, 1931. Serial No. 539,466.

This invention relates to brakes, and is illustrated as embodied in novel operating mechanism or "hookup" for a system of mechanical four-wheel brakes for an automobile.

One feature of the invention relates to a safety mounting for the ends of the brake cross-shaft, according to which these ends are journaled in bearings formed in or carried by a pair of brackets mounted on the side chassis frame members over openings through which the ends of the shaft pass and which are of slightly larger diameter than the shaft. Thus if anything happens to one of the bearing brackets, the shaft is still held by the opening in the frame. Preferably the brake-operating levers are mounted on the ends of the shaft between the brackets and the side frame members.

According to an important minor feature of the invention, the ends of the shaft journaled in the brackets are reduced in diameter, thereby minimizing the bearing friction.

I prefer to build up the shaft of alined sections connected by a reduced-diameter part journaled in a novel center or safety bearing. The connection from the pedal or its equivalent may be to a novel lever or the like secured to both of said sections and straddling the safety bearing.

The above and other objects and features of the invention, including various novel combinations of parts and desirable particular constructions, will be apparent from the following description of the illustrative embodiment shown in the accompanying drawing, in which:

Figure 1 is a diagrammatic top plan view of an automobile chassis embodying the invention;

Figure 2 is an elevation, looking in the direction of the arrows 2—2 of Figure 1, and showing one of the end shaft bearings;

Figure 3 is a section on the line 3—3 of Figure 2, showing the mounting of the end shaft bearing;

Figure 4 is a section on the line 4—4 of Figure 1, showing the center bearing and the pedal connection;

Figure 5 is a plan view of the center bearing, looking in the direction of the arrows 5—5 of Figure 4; and Figure 6 is a detail section showing a modified center bearing.

The chassis illustrated includes wheels 10 having brakes 12 operated by cables or rods or the like 14, and supported by front and rear axles 16 and 18 carrying (through the usual springs) a chassis frame including side members 20 and cross members 22.

The brakes are applied by operating levers 24 connected to cables 14 and keyed on the ends of a novel brake shaft formed of alined sections 26 operated by a pedal 28.

According to one feature of the invention, the ends of the shaft pass through openings 30 in the side members 20 and (preferably being reduced in diameter to minimize friction) are journaled in bearings formed in brackets 32 secured to side members 20 over the openings 30, the levers 24 being arranged between the side members 20 and the brackets 32. The openings 30 are of slightly greater diameter than the shaft, and form safety bearings for the shaft in case of breakage of either of the bearing brackets 32.

The sections 26 are shown as connected by a reduced-diameter part 34, which may be a separate part or an integral extension of one section 26, and which is seated in sockets in the ends of one or both of the sections, according as it is integral with one section or formed as a separate part. A safety center bearing or bracket carried by one cross frame member 22, and shown in Figure 5 as folded up as a steel stamping 36 and shown in Figure 6 as a forged part 38, is provided for the reduced-diameter part 34. As shown in Figure 4, the bearing part may be formed as a bayonet slot 40, so that the bearing may be removed and replaced without disassembling the shaft.

The connection from the pedal is through a rod or cable of any suitable character to a novel forked lever 42, which straddles the bearing 36 or 38, and is keyed and firmly clamped to the ends of sections 26. The lever 42 in effect forms a rigid connection between the sections 26, so that this portion of the shaft, in spite of the small diameter of part 34, is actually the strongest part of the shaft.

While one illustrative embodiment has been described in detail, it is not my intention to limit the scope of the invention to that particular embodiment, or otherwise than by the terms of the appended claims.

I claim:

1. A chassis having side frame members formed with openings, a brake cross-shaft passing through said openings and which is of slightly less diameter than said openings and which has reduced-diameter ends, and brackets secured to the frame over said openings and forming bearings for said reduced-diameter ends, together with brake-operating levers on the ends of the shaft between the side frame members and the brackets.

2. A chassis having side frame members formed with openings, a brake cross-shaft passing through said openings and which is of slightly less diameter than said openings, and brackets secured to the frame over said openings and forming bearings for the ends of said shaft, together with brake-operating levers on the ends of the shaft between the side frame members and the brackets.

3. A brake-operating shaft in two alined sections having a reduced-diameter part therebetween, a bearing for said part, and brake-applying means connected to said sections on opposite sides of said bearing.

4. A brake shaft comprising alined sections connected by a reduced-diameter part, a shaft bearing for said part, and a rigid connection between the sections independent of said part and its bearing.

5. A brake shaft comprising alined sections, a shaft bearing at the joint between the sections, and an operating lever rigidly connecting the sections and having two parts straddling said bearing.

6. A brake shaft comprising alined sections connected by a reduced-diameter part, a shaft bearing for said part, and an operating lever rigidly connecting the sections and having two parts straddling said bearing.

In testimony whereof, I have hereunto signed my name.

EUGENE G. McDONALD.